Patented Sept. 26, 1939

2,174,491

UNITED STATES PATENT OFFICE 2,174,491

METHOD OF MAKING LACTIC ACID RESINOUS PRODUCTS

Paul D. Watson, Alexandria, Va.; dedicated to the free use of the People in the territory of the United States No Drawing. Application June 28, 1938, Serial No. 216,303

1 Claim. (Cl. 260—67)

(Granted under the act of March 3, 1883, as amended April 30, 1928; 370 O. G. 757)

The application is made under the act of March 3, 1883, as amended by the act of April 30, 1928, and the invention herein described and claimed, if patented, may be manufactured and used by or for the Government of the United States for governmental purposes without the payment to me of any royalty thereon.

I hereby dedicate the invention herein described to the free use of the People in the territory of the United States to take effect on the granting of a patent to me.

The object of my invention is to aid the dairy industry by increasing the use of lactic acid, which is a by-product thereof.

My invention has as objects, the production of new resins made from lactic acid, which are insoluble in water and alcohol; the production of new compositions of matter. Particularly coating compositions comprising these resins; and, a new process for the manufacture of these resins.

While it has been known heretofore that resins could be made from lactic acid, the prior processes and the products produced thereby are different from the process and resins herein disclosed. This prior art will be briefly discussed below to indicate these differences.

(1) German Patent 305,775, February 13, 1917, and United States Patent 1,849,107, March 15, 1932.

(2) United States Patents 1,849,108, March 15, 1932; and 1,871,725, August 16, 1932.

(3) United States Patent 1,995,970, March 26, 1935.

With reference to (1): This resinous product is made by heating in a vacuum for a long time and the lactic acid is condensed with formaldehyde. In my process no vacuum is used, and my resin does not contain formaldehyde as an ingredient.

With reference to patents in (2): This resin is made by heating lactic acid under reflux. This method would produce a soft resin, and the patent states the melting point as 30-35° C. No withdrawing agent is used as in my method. The melting point of my cured resin is much higher (above 130° C.), or is infusible. In order to form coatings from this soft resin it is necessary to add cellulose acetate. Coatings may be formed from my resins without addition of this compound.

With reference to (3), this patent describes a process which employs a considerably higher temperature range than is used in my process under a pressure below 100 mm. of mercury, whereas my process is conducted at atmospheric pressure. The resins in (3) are stated to be soluble in ethyl alcohol, whereas my resins are insoluble in this solvent. Moreover, the melting point of the resins (80° C. to 100° C.) is markedly lower than that of my resin, which melts above 130° C., or is infusible. The resin must be mixed with nitrocellulose and other compounds in order to form durable coatings, whereas my resin forms durable coatings when used alone in a proper solvent.

The above facts indicate that my process and the resins produced by it are markedly different from that described in the prior art.

My new resins may be made from lactic acid solutions of any concentration. My researches have shown that resins made from lactic acid alone are not highly resistant to water and alcohol, but that the addition of a relatively small proportion of certain agents hereinafter set forth, combined with adequate curing at temperatures of 150° C. to 170° C. yielded hard resins which were insoluble in water and in ethyl alcohol.

The resins prepared as disclosed herein ranged in color from yellow to dark brown. A lighter color may be obtained by dissolving the resin and then removing color by means of decolorizing carbon. The color and hardness depend on the particular hardening agents used and the period of baking. Almost infusible and insoluble resins were produced by baking the resins at temperatures of 150° C. to 170° C. for about 4 to 6 weeks. The resins of medium hardness are soluble in acetone, benzol and toluol, but the hard resins are not. In order to dissolve the powdered resin it is necessary to heat them in higher boiling solvents, for example, the mono-ethyl or the mono-methyl ethers of ethylene glycol. The very hard resins are substantially infusible and insoluble, and it is necessary to halt the curing of these resins at the proper stage, with a view to their ultimate use, viz; as coatings, or as moulding powders.

Coatings suitable for wood and metal may be made from these resins by dissolving the powdered resin in the mono-methyl or mono-ethyl ethers of ethylene glycol and then cutting the concentrated solution with benzol, acetone, toluol or other low boiling solvents.

My invention also is directed to the production of a lacquer, containing these resins, which is highly resistant to water, weak acids and alcohol, in order to satisfy the stringent requirements necessary in a coating for the interior of beer cans. There is a large field for a coating of this kind, and heretofore the only satisfactory source has been the vinyl resin type lacquer, which requires a priming coat when applied to tinplate.

Tests have indicated that the alcohol resistant lacquers developed by me have use in the foregoing field, either alone or as an ingredient of other coatings.

These coatings have a high gloss, are golden yellow in color, are fairly flexible and adhere well to metal, without the use of a priming coat. Samples coated and then baked on tinplate at a temperature of about 140 to 150° C. have withstood the action of 95% alcohol in tests lasting more than 5 months.

Moreover, I have found that my resins may be blended with linseed oil, by the use of benzene as a mutual solvent, and consequently they have use as an ingredient of paints and varnishes, for which purpose alkyd type resins are now used.

The first phase of my process involves heating the aqueous lactic acid with an entraining liquid which is immiscible with water and which has a relatively high boiling point. The entraining liquids used may be, for example, Cymene (B. P. 176° C.), and high boiling petroleum fractions such as Solvesso No. 3 (B. P. 185–216° C.), Skellysolve S (B. P. 157–199° C.), Sovasol No. 5 (B. P. 155–202° C.), or kerosene, which serve to heat the lactic acid during the final stage of the distillation to a maximum temperature range of 180° C. to 240° C. The advantage in using these high boiling liquids is that the free water, and the combined water liberated in the conversion of the lactic acid to lactyllactic acid and lactide is expeditiously removed with very little loss of lactic acid or discoloration of the product. Moreover, my process may be controlled so that either a semi-fluid or very viscous dehydrated product may be obtained, which is of advantage in the addition of the various hardening agents. Resulting product is composed of varying amounts of lactyllactic acid and lactide, or principally lactide with a titratable acidity over the range of 111% to 125% calculated as lactic acid, depending upon the degree of dehydration.

The second phase of my process consists in the addition of relatively small amounts of certain agents hereinafter set forth which accelerate the hardening of the resin by means of catalytic action, or which facilitate the formation of the complex cross-hatched molecular structure, which is essential in the formation of thermosetting resins. The mixture is thoroughly stirred while heated to a temperature of 150° C. to 170° C. for several hours. Examples of the various agents and the percentage by weight of each which are to be added to the dehydrated products are listed below:

(1) Dibutyl phthalate (10%–20%).
(2) Dibutyl phthalate (10–15%) and glycerol (10–15%).
(3) Furfurol (5%) and glycerol (5–10%).
(4) Furfurol (5%), glycerol (5–10%) and acetic anhydride (5–10%).
(5) Furfurol (5%), glycerol (5–10%) and benzoyl peroxide (1%).
(6) Furfurol (5%), glycerol (5–10%) and ammonium persulphate (0.2%).
(7) Furfurol (5%) and glycerol (5–10%) with esterification with an excess of absolute ethyl alcohol for one hour by boiling under reflux.
(8) Benzol, in excess, with anhyd. aluminum chloride (about 5%) and boiling two hours under reflux.
(9) Glycerol (10–15%) with anhyd. aluminum chloride (about 5%), and heating ½ hour at 150° C.
(10) Glycerol (2–5%), acetic anhydride (0.5–2%).

In (7) and (8) above, the excess solvent was removed by distilling it off. In (8) and (9) above, the insoluble residue produced by the addition of aluminum chloride was removed by filtration after liquefying the viscous product with acetone, which was then distilled off.

I have found that the use of acetic anhydride, benzoyl peroxide or esterification with alcohol as mentioned above, appreciably shortened the baking time necessary to produce an alcohol-insoluble resin. Moreover, the addition of acetic anhydride and benzoyl peroxide tended to keep the resin from darkening in color, producing a clear, light brown resin.

After the addition of the above hardening agents the viscous product was poured while hot into aluminum pans, and baked at a temperature of 150° C. to 170° C. for a period of 2 to 6 weeks, depending upon composition of the resin, the thickness of layer, and the degree of hardness desired in the resin. A baking temperature of about 150° C. is preferable in those instances where excessive darkening of the resin is undesirable.

During the baking process, water produced by condensation reactions, and unreacted lactide was driven off. The lactide may be recovered by drawing a current of air through the ovens and into a water cooled condenser system in which the lactide collected in the form of white needles. This ventilation of the ovens was helpful in accelerating the curing process, and in the recovery of the lactide.

In practicing my invention, I may take lactic acid of substantially 85% U. S. P. and remove the water therefrom in an amount approximating 35% of the weight of the original acid. This may be accomplished by distillation with the use of a liquid entraining agent. This liquid entraining agent is then removed from the dehydrated product, which was 93.6% of the theoretical yield, calculated as lactide.

An excess of furfurol (8%) and 5% of glycerol by weight may then be added to the dehydrated product, after which the mixture may be stirred and heated on a steam bath for several hours. The viscous mass was then poured into pans to a depth of about ⅜ inch, and baked for 4 weeks in an oven at a temperature of substantially 150° C. The amount of cured resin obtained was 62% of the viscous product before curing. It is estimated that this yield could be increased to approximately 70% by the addition of the lactide recovered in the baking process.

It is to be understood that the preceding description of my invention is given by way of illustration, and that variations may be made therein without departing from the scope of this invention.

Having thus described my invention, what I claim for Letters Patent is:

A process for making resins, which comprises heating aqueous lactic acid in contact with a high boiling petroleum fraction ranging from 155° C. to 216° C., the while distilling off the free and combined water; thence continuously returning the distilled entraining liquid to the mixture; thence separating the resulting product from the entraining liquid; thence adding furfurol, glycerol and ethyl alcohol thereto, and thence subjecting the resulting product in substantially thin layers to temperatures ranging from 150° C. to 170° C. for a period ranging from two weeks to six weeks.

PAUL D. WATSON.